US012772307B2

(12) United States Patent
Karampatsis et al.

(10) Patent No.: US 12,772,307 B2
(45) Date of Patent: Oct. 20, 2026

(54) ALLOWING CONNECTIVITY BETWEEN A UAV AND A UAV-C

(71) Applicant: Lenovo (Singapore) Pte. Ltd., New Tech Park (SG)

(72) Inventors: Dimitrios Karampatsis, Ruislip (GB); Andreas Kunz, Ladenburg (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 357 days.

(21) Appl. No.: 18/559,129

(22) PCT Filed: May 5, 2022

(86) PCT No.: PCT/IB2022/054170
§ 371 (c)(1),
(2) Date: Nov. 6, 2023

(87) PCT Pub. No.: WO2022/234514
PCT Pub. Date: Nov. 10, 2022

(65) Prior Publication Data
US 2024/0237089 A1 Jul. 11, 2024

Related U.S. Application Data

(60) Provisional application No. 63/184,421, filed on May 5, 2021.

(51) Int. Cl.
*H04W 76/11* (2018.01)
*H04L 67/141* (2022.01)
*H04L 67/12* (2022.01)

(52) U.S. Cl.
CPC .......... *H04W 76/11* (2018.02); *H04L 67/141* (2013.01); *H04L 67/12* (2013.01)

(58) Field of Classification Search
CPC ......... H04W 76/11; H04W 8/26; H04W 4/50; H04L 67/141; H04L 67/12; H04L 47/70; H04L 67/147; H04L 67/34; H04L 67/14
See application file for complete search history.

(56) References Cited

U.S. PATENT DOCUMENTS

2006/0182280 A1* 8/2006 Laitinen ................ H04L 63/166 380/247
2008/0279168 A1* 11/2008 Kalhan ................. H04W 48/12 370/342

(Continued)

FOREIGN PATENT DOCUMENTS

WO 2020135274 A1 7/2020
WO 2021016629 A1 1/2021
WO WO-2021016629 A2 * 1/2021 ............ H04W 72/51

OTHER PUBLICATIONS

NPL Document, "Solution on UAV controller and a UAV association" Aug. 13, 2020 (Year: 2020).*

(Continued)

*Primary Examiner* — Mewale A Ambaye
(74) *Attorney, Agent, or Firm* — Kunzler Needham & Hilton; Bruce R. Needham

(57) ABSTRACT

Apparatuses, methods, and systems are disclosed for allowing connectivity between a UAV and a UAV-C. One method includes receiving, at a network function, a first request from a first USS. The first request indicates to replace a first UAV-C of a first UAV, and the first request includes an IP address of the first UAV, a requested QoS, flow descriptors identifying traffic, UAV to UAV-C pairing information, or some combination thereof. The method includes transmitting a second request to a policy control function. The second request includes a request to trigger policies to allow (Continued)

connectivity between the first UAV and a second UAV-C based on the UAV to UAV-C pairing information.

20 Claims, 8 Drawing Sheets

(56) References Cited

U.S. PATENT DOCUMENTS

2016/0320819 A1* 11/2016 Atkinson .................. G06F 1/26
2021/0321468 A1* 10/2021 Zhang ................... H04W 76/12

OTHER PUBLICATIONS

PCT/IB2022/054170, "Notification of Transmittal of the International Search Report and the Written Opinion of the International Searching Authority, or the Declaration", International Searching Authority, Jul. 20, 2022, pp. 1-17.
Xiaomi, "Solution on UAV controller and UAV association management", 3GPP TSG-WG SA2 Meeting #140E S2-2005819, Aug. 19-Sep. 1, 2020, pp. 1-5.
Qualcomm Inc., "Sol#5 Update: Simplification and clarifications of solution 5", 3GPP TSG-WG SA2 Meeting #141E e-meeting S2-2007341, Oct. 12-23, 2020, pp. 1-22.
Interdigital et al., "TS 23.256: UAV Controller Replacement", SA WG2 Meeting #S2-144E S2-2102895, Apr. 12-16, 2021, pp. 1-2.
3GPP, "3rd Generation Partnership Project; Technical Specification Group Services and System Aspects; Support of Uncrewed Aerial Systems (UAS) connectivity, identification and tracking; Stage 2 (Release 17)", 3GPP TR 23.256 V0.1.0, Mar. 2021, pp. 1-25.
3GPP, "3rd Generation Partnership Project; Technical Specification Group Services and System Aspects; Study on supporting Unmanned Aerial Systems (UAS) connectivity, Identification and tracking (Release 17)", 3GPP TR 23.754 V17.1.0, Mar. 2021, pp. 1-140.
3GPP, "3rd Generation Partnership Project; Technical Specification Group Services and System Aspects; Procedures for the 5G System (5GS); Stage 2 (Release 17)", 3GPP TS 23.502 V17.0.0, Mar. 2021, pp. 1-646.

* cited by examiner

ALLOWING CONNECTIVITY BETWEEN A UAV AND A UAV-C

CROSS-REFERENCE TO RELATED APPLICATIONS

This application claims priority to U.S. Patent Application Ser. No. 63/184,421 entitled "APPARATUSES, METHODS, AND SYSTEMS FOR PROVIDING PAIRING POLICIES FOR REPLACING A UAV CONTROLLER" and filed on May 5, 2021 for Dimitrios Karampatsis et al., which is incorporated herein by reference in its entirety.

FIELD

The subject matter disclosed herein relates generally to wireless communications and more particularly relates to allowing connectivity between a UAV and a UAV-C.

BACKGROUND

In certain wireless communications networks, UAVs may be used in a system. In such networks, various USS actions may not operate efficiently and/or with sufficient actions.

BRIEF SUMMARY

Methods for allowing connectivity between a UAV and a UAV-C are disclosed. Apparatuses and systems also perform the functions of the methods. One embodiment of a method includes receiving, at a network function, a first request from a first USS. The first request indicates to replace a first UAV-C of a first UAV, and the first request includes an IP address of the first UAV, a requested QoS, flow descriptors identifying traffic, UAV to UAV-C pairing information, or some combination thereof. In some embodiments, the method includes transmitting a second request to a policy control function. The second request includes a request to trigger policies to allow connectivity between the first UAV and a second UAV-C based on the UAV to UAV-C pairing information.

One apparatus for allowing connectivity between a UAV and a UAV-C includes a user equipment. In some embodiments, the apparatus includes a receiver to receive a first request from a first USS. The first request indicates to replace a first UAV-C of a first UAV, and the first request includes an IP address of the first UAV, a requested QoS, flow descriptors identifying traffic, UAV to UAV-C pairing information, or some combination thereof. In various embodiments, the apparatus includes a transmitter to transmit a second request to a policy control function. The second request includes a request to trigger policies to allow connectivity between the first UAV and a second UAV-C based on the UAV to UAV-C pairing information.

Another embodiment of a method for allowing connectivity between a UAV and a UAV-C includes receiving, at a policy control function, a second request from a network function. The second request includes a request to trigger policies to allow connectivity between a first UAV and a second UAV-C while blocking connectivity to other UAV controllers. In some embodiments, the method includes transmitting a first response to the network function. The first response includes an acknowledgment of the second request.

Another apparatus for allowing connectivity between a UAV and a UAV-C includes a user equipment. In some embodiments, the apparatus includes a receiver to receive a second request from a network function. The second request includes a request to trigger policies to allow connectivity between a first UAV and a second UAV-C while blocking connectivity to other UAV controllers. In various embodiments, the apparatus includes a transmitter to transmit a first response to the network function. The first response includes an acknowledgment of the second request.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
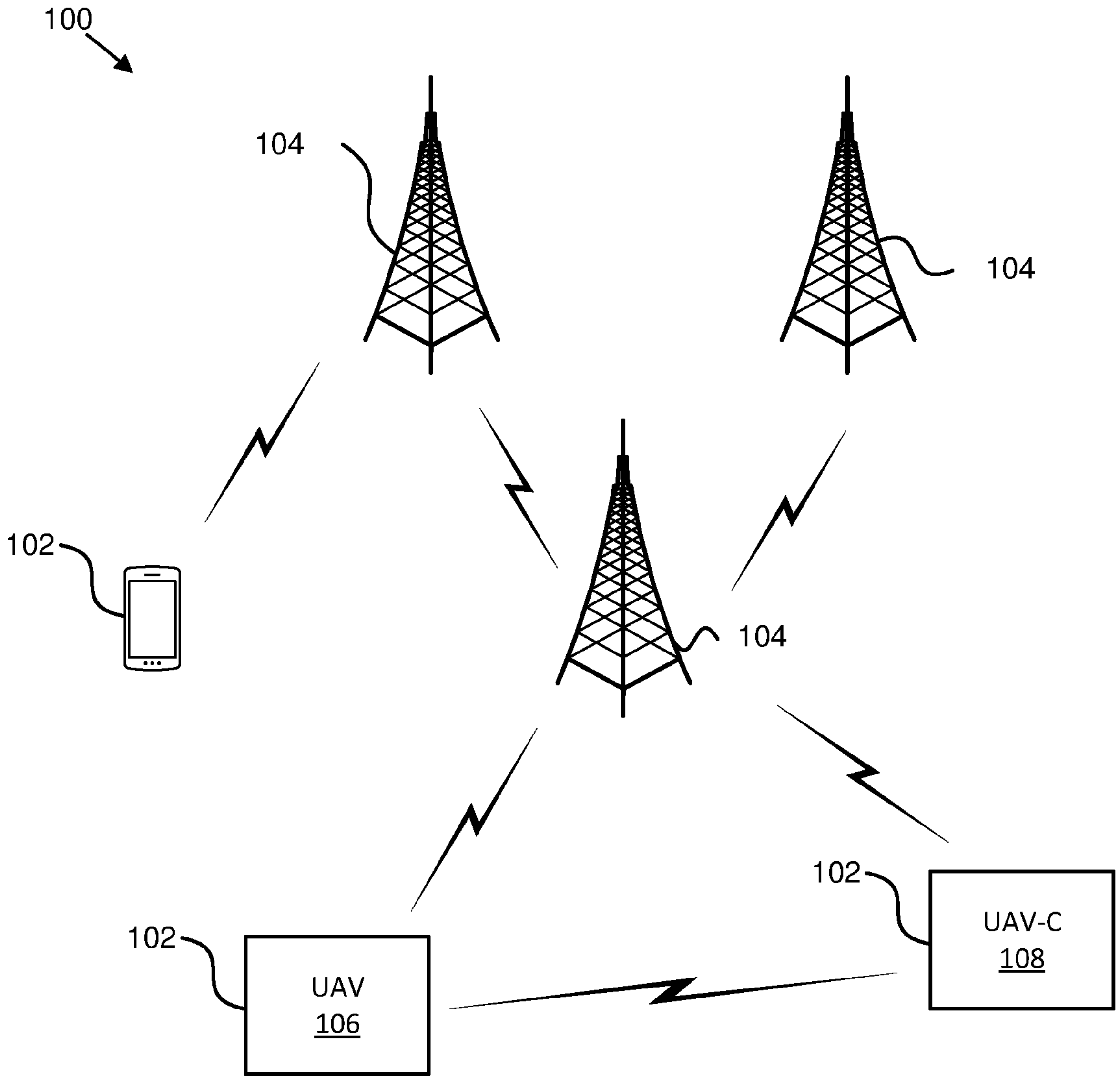
FIG. 1 is a schematic block diagram illustrating one embodiment of a wireless communication system for allowing connectivity between a UAV and a UAV-C.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for allowing connectivity between a UAV and a UAV-C. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones (e.g., UAV 106, UAV-C 108), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, user equipment ("UE"), user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfox, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a network unit 104 may receive, at a network function, a first request from a first USS. The first request indicates to replace a first UAV-C of a first UAV, and the first request includes an IP address of the first UAV, a requested QoS, flow descriptors identifying traffic, UAV to UAV-C pairing information, or some combination thereof. In some embodiments, the network unit 104 may transmit a second request to a policy control function. The second request includes a request to trigger policies to allow connectivity between the first UAV and a second UAV-C based on the UAV to UAV-C pairing information. Accordingly, the network unit 104 may be used for allowing connectivity between a UAV and a UAV-C.

In certain embodiments, a network unit 104 may receive, at a policy control function, a second request from a network function. The second request includes a request to trigger policies to allow connectivity between a first UAV and a second UAV-C while blocking connectivity to other UAV controllers. In some embodiments, the network unit 104 may transmit a first response to the network function. The first response includes an acknowledgment of the second request. Accordingly, the network unit 104 may be used for allowing connectivity between a UAV and a UAV-C.

Figure 2:
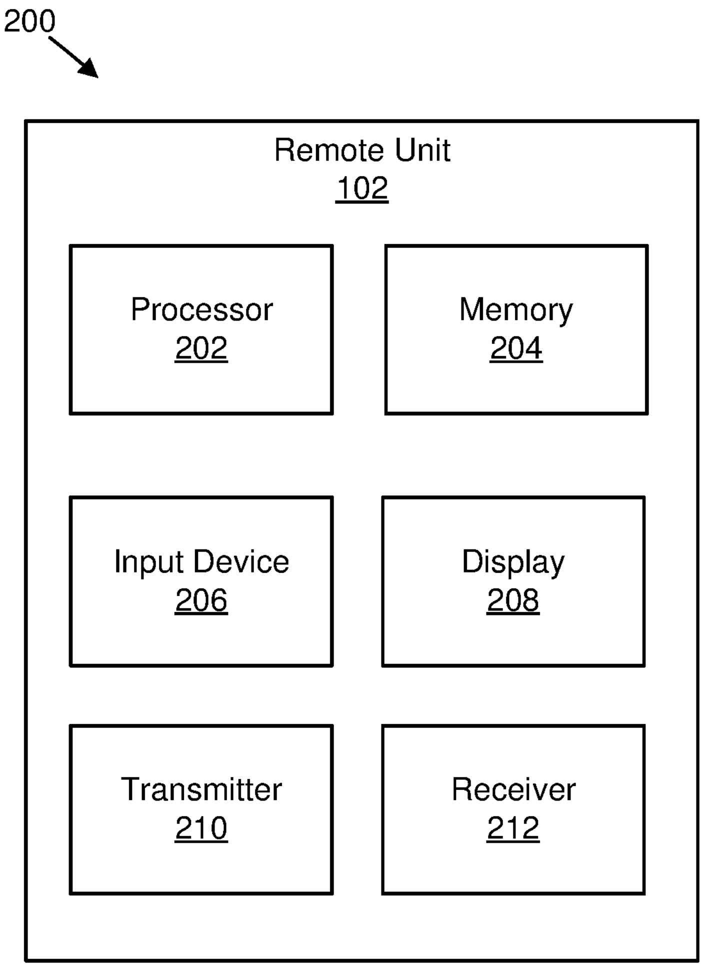
FIG. 2 is a schematic block diagram illustrating one embodiment of an apparatus that may be used for allowing connectivity between a UAV and a UAV-C.

FIG. 2 depicts one embodiment of an apparatus 200 that may be used for allowing connectivity between a UAV and a UAV-C. The apparatus 200 includes one embodiment of the remote unit 102 (e.g., UAV 106, UAV-C 108). Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
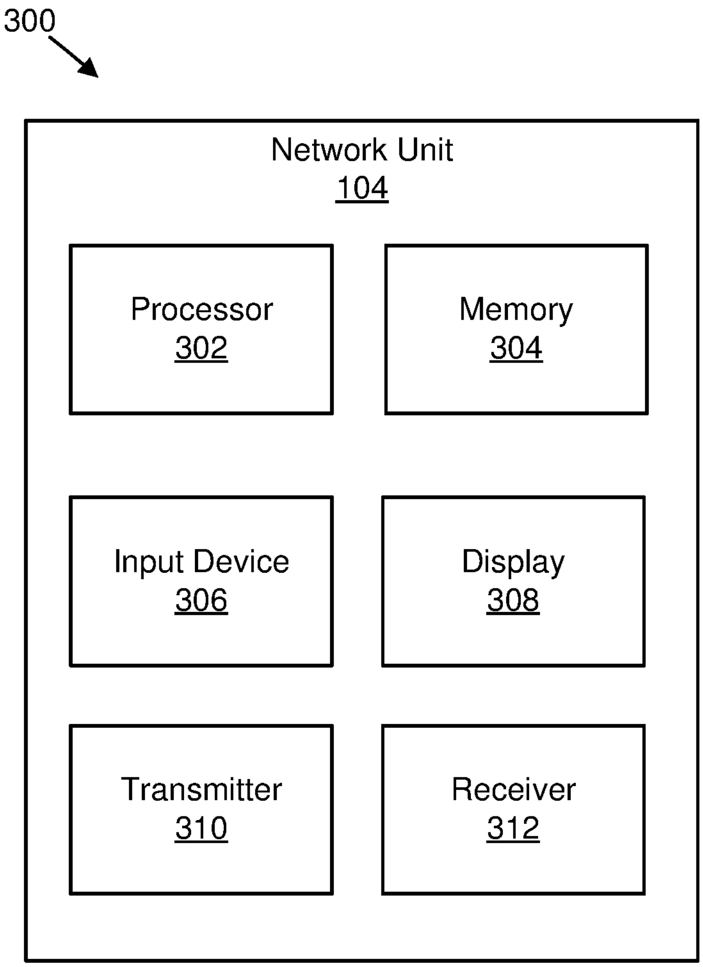
FIG. 3 is a schematic block diagram illustrating one embodiment of an apparatus that may be used for allowing connectivity between a UAV and a UAV-C.

FIG. 3 depicts one embodiment of an apparatus 300 that may be used for allowing connectivity between a UAV and a UAV-C. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the receiver 312 may receive a first request from a first USS. The first request indicates to replace a first UAV-C of a first UAV, and the first request includes an IP address of the first UAV, a requested QoS, flow descriptors identifying traffic, UAV to UAV-C pairing information, or some combination thereof. In various embodiments, the transmitter 310 may transmit a second request to a policy control function. The second request includes a request to trigger policies to allow connectivity between the first UAV and a second UAV-C based on the UAV to UAV-C pairing information.

In some embodiments, the receiver 312 may receive a second request from a network function. The second request includes a request to trigger policies to allow connectivity between a first UAV and a second UAV-C while blocking connectivity to other UAV controllers. In various embodiments, the transmitter 310 may transmit a first response to the network function. The first response includes an acknowledgment of the second request.

It should be noted that one or more embodiments described herein may be combined into a single embodiment.

In certain embodiments, 3GPP enables unmanned aerial systems ("UASs") that include an unmanned aerial vehicle ("UAV") controller and an UAV to operate (e.g., perform UAV operations) via a fifth generation ("5G") mobile communication network.

To support a UAS in a 3GPP system there may be: 1) a UAS network function ("UASNF") which: a) exposes to UAS traffic management ("UTM") and/or UAS service supplier ("USS") location information about the UAV using 3GPP location service ("LCS") and/or presence reporting information from an AMF, and b) interfaces with a UTM and/or USS for UAV authentication and authorization—authorizing a UAV to carry out UAV operations via the 3GPP network: and/or 2) a UAS that includes a UAV and its controller which: a) establishes user plane connectivity with a UTM and/or USS for providing remote identification and tracking information, b) establishes user plane connectivity between a UAV controller ("UAV-C") and UAV for command and control ("C2"), and c) a requirement is that the UAS has already registered to a USS provider with a procedure. In addition, the UAS must have a valid flight authorization provided by a USS provider with a procedure.

In some embodiments, a UAV is authorized to access a 5G mobile communication network to carry out UAV operations. More specifically the network may perform the following: 1) USS UAV authorization and/or authentication ("UUAA") to verify that a UAS has a valid registration to a UAS service supplier ("USS") provider: and/or 2) C2 authorization: authorizes a UAV to establish user plane connectivity via the 3GPP system for UAV operations (e.g., C2).

In various embodiments, when the UAV requests a protocol data unit ("PDU") session for C2, the SMF determines if the PDU session requires authorization from the UAV and sends an authorization request to the USS via a UAS network function ("NF"). The UAV includes in the PDU session a request for UAV pairing information (e.g., UAV-C, UAV pairing information) within a transparent container that the SMF forwards to the USS via the UAS NF. The USS authorizes the request and sends authorization information that includes pairing information in the response to the SMF. The SMF requests policies from the PCF include the authorization information provided by the USS. Based on the charging and policy control ("PCC") rules provided by the PCF, the SMF configures the UPF with routing rules (e.g., to ensure traffic for C2 is only between the UAV and UAV-C).

In certain embodiments: 1) a USS action may be performed if the UAV did not provide any pairing information within the PDU session request: 2) the USS action may be performed if the USS determines that the pairing information has changed: and/or 3) the USS action may be performed if the USS determines that flight authorization information has changed.

In a first embodiment, once a USS determines that a UAV controller for C2 needs to be replaced, the USS determines new pairing information and invokes an Nnef service operation request to setup a session with required quality of service ("QoS") and providing authorization information that includes specific pairing information to a new UAV-C to the UAS NF. The service operation may be an Nnef_AFsessionWithQoS_Create service operation. In some embodiments, a new service operation may be defined.

In the Nnef_AFsessionWithQoS_Create operation the USS includes: 1) an internet protocol ("IP") address of the UAV: 2) a QoS reference: 3) flow descriptors: and/or 4) UAS authorization information that includes pairing information (e.g., a UAV-C address). The authorization information may be included in a UAS container. The UAS container may be a specific container for C2 communications. In various embodiments, the authorization information may be included within the flow descriptors.

In certain embodiments, when a network exposure function ("NEF") receives a request, the NEF identifies a PCF serving the UAV and triggers the PCF to derive policies for the session. The NEF includes in the request the authorization information. The PCF determines PCC rules for the UAV taking into account the authorization information that is sent to the SMF serving the UAV. The PCC rule instructs the SMF to allow access only to the new UAV-C.

Figure 4:
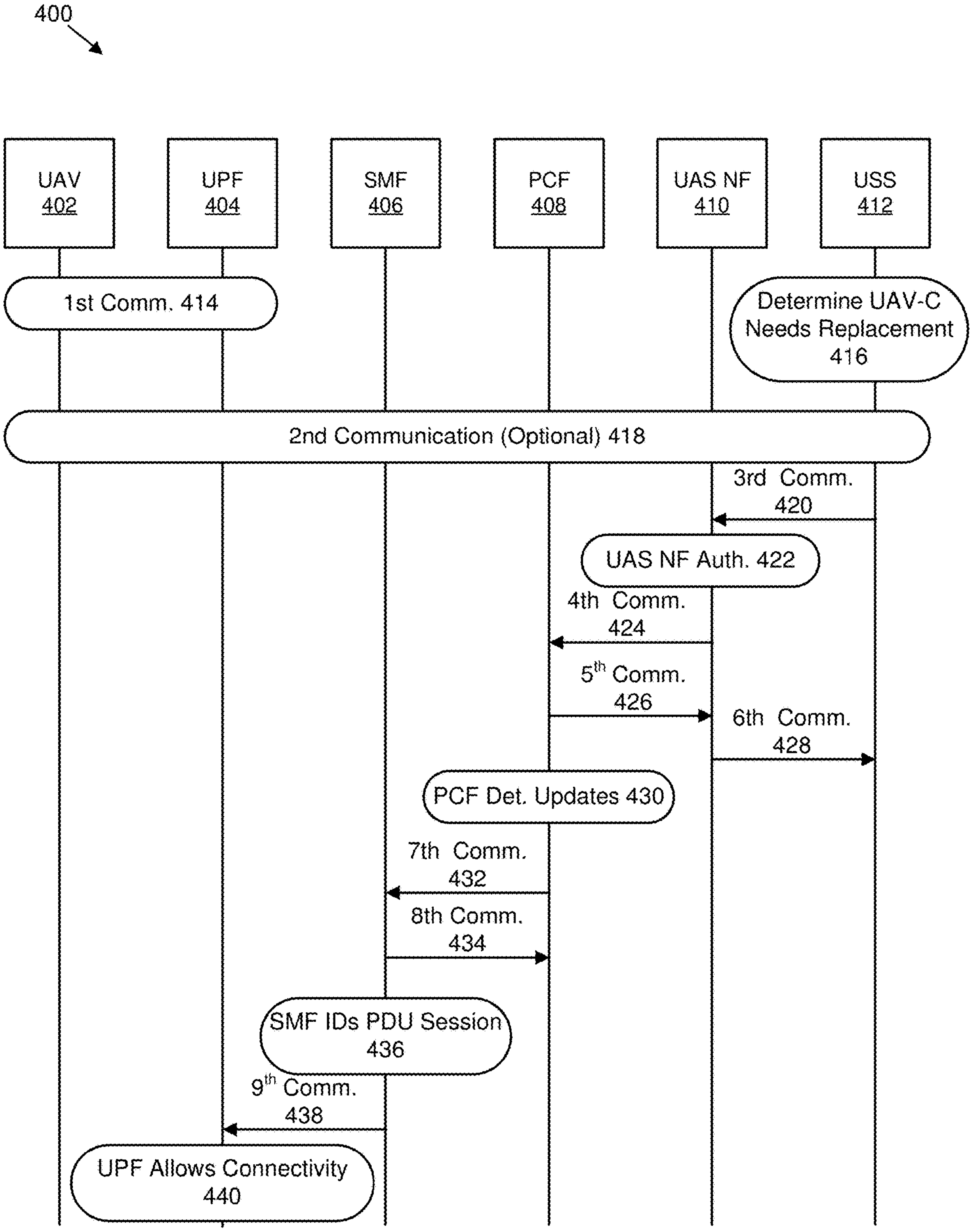
FIG. 4 is a schematic block diagram illustrating one embodiment of a system for informing a 5GC about a replaced UAV-C.

FIG. 4 is a schematic block diagram illustrating one embodiment of a system 400 for informing a 5GC about a replaced UAV-C. The system 400 includes a UAV 402, a UPF 404, an SMF 406, a PCF 408, a UAS NF 410, and a USS 412. Each of the communications in the system 400 may include one or more messages.

In a first communication 414, the UAV 402 establishes user plane connectivity for C2 operation with the UPF 404.

The USS 412 determines 416 that the UAV-C controlling the UAV 402 needs to be replaced (e.g., if the UAV is misbehaving) or that traffic flows related to a valid flight information has changed. In an optional second communication 418, the USS 412 may also initiate a procedure to revoke the authorization of the previous UAV-C.

In a third communication 420, the USS 412 sends an Nnef_AFSessionWithQoS_Create request including in the request: the IP address of the UAV, flow descriptors identifying the traffic flows for C2 operation that require PCC rules, and/or a QoS reference and authorization information that includes pairing information (e.g., the address of the replaced UAV-C).

The UAS NF 410 authorizes 422 the request.

In a fourth communication 424, the UAS NF 410 identifies the PCF serving the UAV (e.g., based on the IP address of the UAV) and triggers a Npcf_Policy_Authorization_Create Request including the information provided by the USS 412 in the third communication 420.

In a fifth communication 426, the PCF 408 acknowledges the request.

In a sixth communication 428, the UAS NF 410 acknowledges the request sent in the third communication 420.

The PCF 408 determines 430 updates to PCC rules for the session (e.g., identified by flow descriptor) allowing access to the replaced UAV-C.

In a seventh communication 432, the PCF 408 identifies the SMF 406 serving the UAV and invokes an Npcf_SM-PolicyControl_UpdateNotify service operation including PCC rules.

In an eighth communication 434, the SMF 406 acknowledges the request.

The SMF 406 identifies 436 the PDU session based on the UAV address and configures the UPF 404 based on the PCC rules.

In a ninth communication 438, the SMF 406 sends N4 rules to the UPF 404.

The UPF 404 allows 440 connectivity for C2 (e.g., based on the flow descriptors provided) only with the address of the replaced UAV-C.

In a second embodiment, once the USS determines a UAV controller for C2 needs to be replaced, the USS determines the pairing information. The USS then acts as a data network ("DN") authorization, authentication, and accounting ("AAA") ("DN-AAA") and sends a request to update DN authorization data. In such a case, the USS invokes an N33_Auth_Update request including in the request a new DN authorization index and new UAS authorization information including new pairing information. The authorization information may be included in a UAS authorization container. The UAS container may be a specific container for C2 communications.

The UAS NF provides the authorization update to the SMF. Based on the new DN authorization index or based on the UAS authorization information, the SMF is triggered to request updated PCC rules from the PCF including in the request the new authorization information. In one embodiment the SMF identifies that PCC rules are required by the PCF if a policy control request trigger is met for a PDU session. In one embodiment, a new policy control trigger is provided by the PCF to indicate to the SMF that interaction with the PCF is required if new UAS authorization information included in a UAS container is received at the SMF.

Figure 5:
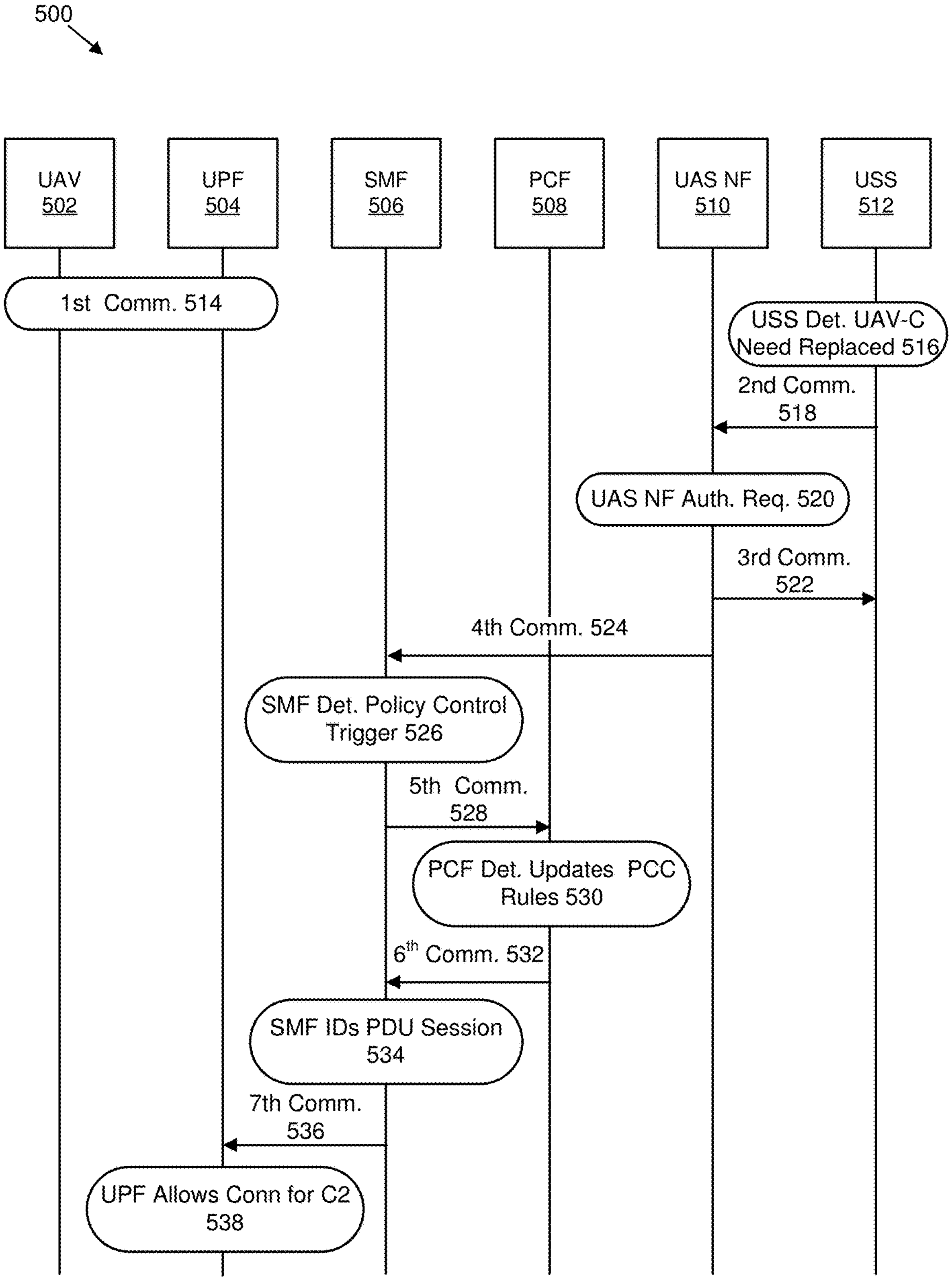
FIG. 5 is a schematic block diagram illustrating another embodiment of a system for informing a 5GC about a replaced UAV-C.

FIG. 5 is a schematic block diagram illustrating another embodiment of a system 500 for informing a 5G core network ("5GC") about a replaced UAV-C. The system 500 includes a UAV 502, a UPF 504, an SMF 506, a PCF 508, a UAS NF 510, and a USS 512. Each of the communications in the system 500 may include one or more messages.

In a first communication 514, the UAV 502 establishes user plane connectivity for C2 operation with the UPF 504.

The USS 512 determines 516 that the UAV-C controlling the UAV 502 needs to be replaced (e.g., if the UAV is misbehaving).

In a second communication 518, the USS 512 sends an N33_Auth_Update request including in the request: the IP address of the UAV, flow descriptors identifying the traffic that require PCC rules, a new DN authorization index, and/or QoS reference and authorization information that includes pairing information (e.g., the address of the replaced UAV-C).

The UAS NF 510 authorizes 520 the request.

In a third communication 522, the UAS NF 510 acknowledges the request sent in the second communication 518.

In a fourth communication 524, the UAS NF 510 identifies the SMF 506 serving the UAV 502 (e.g., based on the IP address of the UAV) and triggers a Nuasnf_Authorization_Update request including the information provided by the USS 512 in the second communication 518.

The SMF 506 determines 526 that a policy control trigger is met due to either a new DN authorization index or due to new authorization data received.

In a fifth communication 528, the SMF 506 requests updated PCC rules from the PCF by invoking an Npcf_SMPolicyControl_Update request. The SMF 506 includes the authorization information received in the fourth communication 524.

The PCF 508 determines 530 updates PCC rules for the session identified by the flow descriptor allowing access to the replaced UAV-C.

In a sixth communication 532, the PCF 508 provides PCC rules to the SMF 506 in the response.

The SMF 506 identifies 534 the PDU session based on the UAV address and configures the UPF 504 based on the PCC rules.

In a seventh communication 536, the SMF 506 sends N4 rules to the UPF 504.

The UPF 504 allows 538 connectivity for C2 (e.g., based on the flow descriptors provided) only to the address of the replaced UAV-C.

A third embodiment may identify when an SMF requires policies from a PCF. For UAS operations, the SMF may require to request policies from the PCF during UUAA or C2 authorization procedures. In both cases the SMF receives from the USS, via the UAS NF, authorization information.

In some embodiments, a new policy control trigger may be used to allow an SMF to determine when new PCC rules are required from the SMF. The PCF provides a policy control trigger at PDU session establishment that when UAS related authorization information is received at the SMF the SMF must request PCC rules from the PCF. The UAS related authorization information may be included in a UAS container. The UAS container may be a specific container for UUAA or C2 communications.

Figure 6:
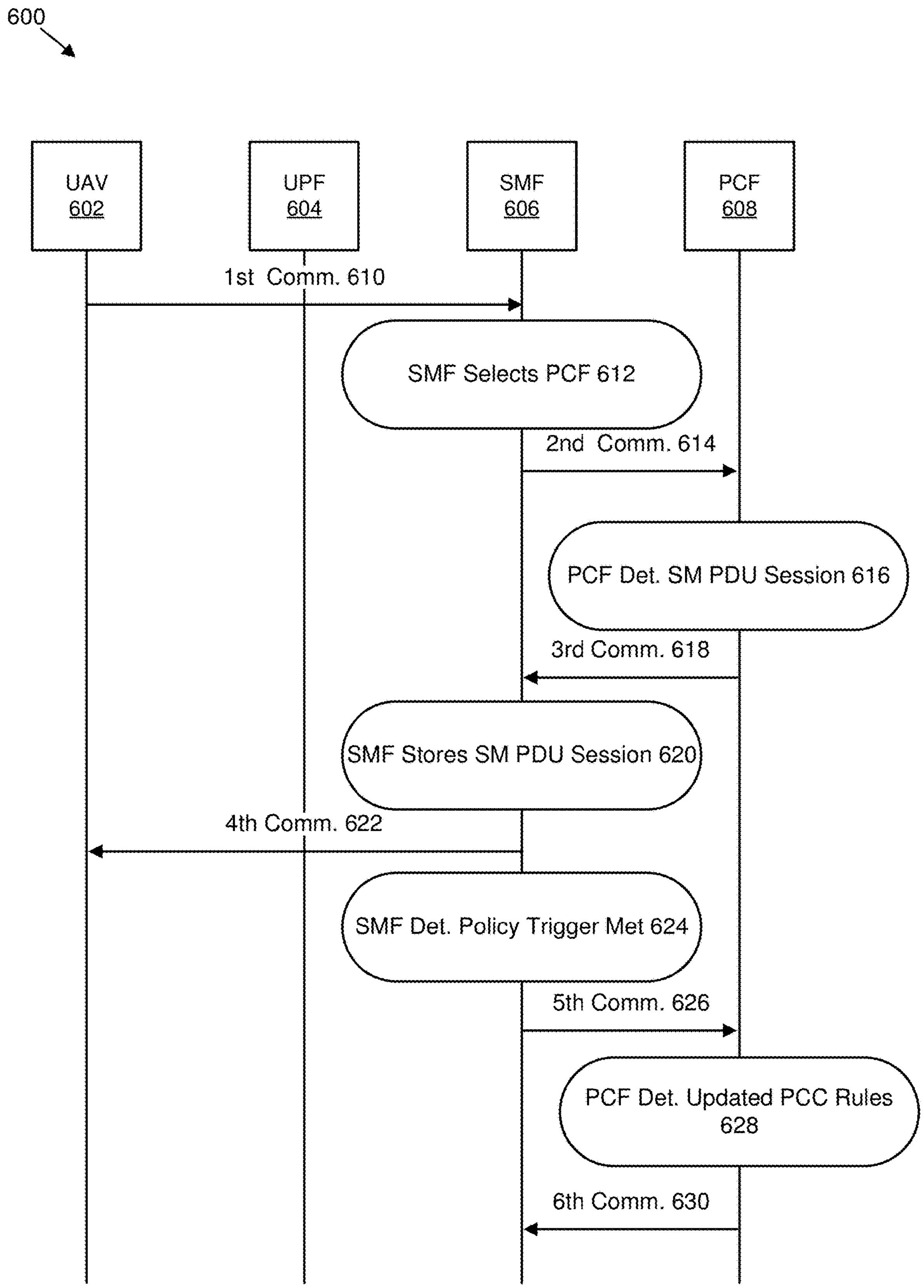
FIG. 6 is a schematic block diagram illustrating one embodiment of a system in which an SMF determines when to request policies for UAS operations from a PCF.

FIG. 6 is a schematic block diagram illustrating one embodiment of a system 600 in which an SMF determines when to request policies for UAS operations from a PCF. The system 600 includes a UAV 602, a UPF 604, an SMF 606, and a PCF 608. Each of the communications in the system 600 may include one or more messages.

In a first communication 610, the UAV 602 requests establishment of a new PDU session by invoking a PDU session establishment request.

The SMF 606 selects 612 the PCF 608.

In a second communication 614, the SMF 606 establishes an SM policy association procedure with the PCF 608.

The PCF 608 determines 616 SM PDU session policies and PCC rules. Based on subscription information, the PCF 608 determines that a policy control trigger for UAS operation is required for the PDU session.

In a third communication 618, the PCF 608 provides SM PDU session policies and PCC rules in an SM policy association response. The SM PDU session policies include a policy control trigger for UAS.

The SMF 606 stores 620 the SM PDU session policies for the PDU session.

In a fourth communication 622, the SMF 606 accepts the PDU session establishment, At a later point in time, the SMF 606 determines 624 that a policy control trigger for UAS is met. This may happen in the following cases: 1) when the SMF 606 receives UAS authorization information from the USS during a UUAA procedure: and/or 2) when the SMF 606 receives authorization information from the USS during a C2 authorization procedure.

In a fifth communication 626, if a policy control trigger for UAS is met, the SMF 606 requests updated PCC rules by invoking a Npcf_SMPolicyControl_Update service operation.

The PCF 608 determines 628 updated PCC rules.

In a sixth communication 630, the PCF 608 provides PCC rules in a response to the fifth communication 626.

The procedure of FIG. 6 may provide policy control triggers that can also be carried out during PDU session modification or based on triggers from an AF.

Figure 7:
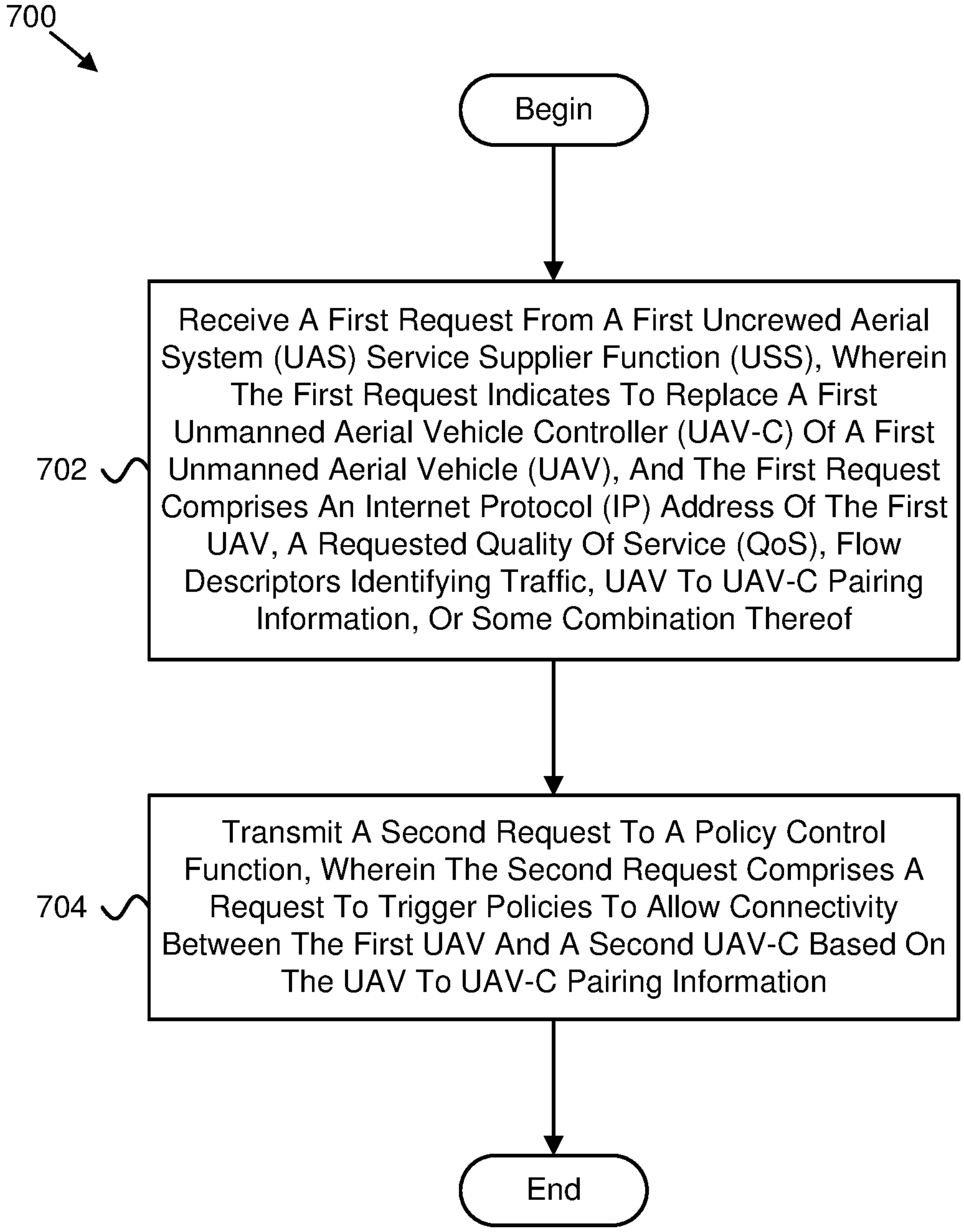
FIG. 7 is a flow chart diagram illustrating one embodiment of a method for allowing connectivity between a UAV and a UAV-C.

FIG. 7 is a flow chart diagram illustrating one embodiment of a method 700 for allowing connectivity between a UAV and a UAV-C. In some embodiments, the method 700 is performed by an apparatus, such as the network unit 104. In certain embodiments, the method 700 may be performed by a processor executing program code, for example, a microcontroller, a microprocessor, a CPU, a GPU, an auxiliary processing unit, a FPGA, or the like.

In various embodiments, the method 700 includes receiving 702, at a network function, a first request from a first USS. The first request indicates to replace a first UAV-C of a first UAV, and the first request includes an IP address of the first UAV, a requested QoS, flow descriptors identifying traffic, UAV to UAV-C pairing information, or some combination thereof. In some embodiments, the method 700 includes transmitting 704 a second request to a policy control function. The second request includes a request to trigger policies to allow connectivity between the first UAV and a second UAV-C based on the UAV to UAV-C pairing information.

In certain embodiments, the UAV to UAV-C pairing information is identified based on an address of the second UAV-C. In some embodiments, the method 700 further comprises authorizing the first request before transmitting the second request. In various embodiments, the method 700 further comprises receiving a first response from the policy control function, wherein the first response comprises an acknowledgment of the second request.

In one embodiment, the method 700 further comprises transmitting a second response to the first application function, wherein the second response comprises an acknowledgment of the first request. In certain embodiments, the USS comprises an application function. In some embodiments, the UAV to UAV-C pairing information comprises information indicating that connectivity from the first UAV is only allowed to the second UAV-C.

Figure 8:
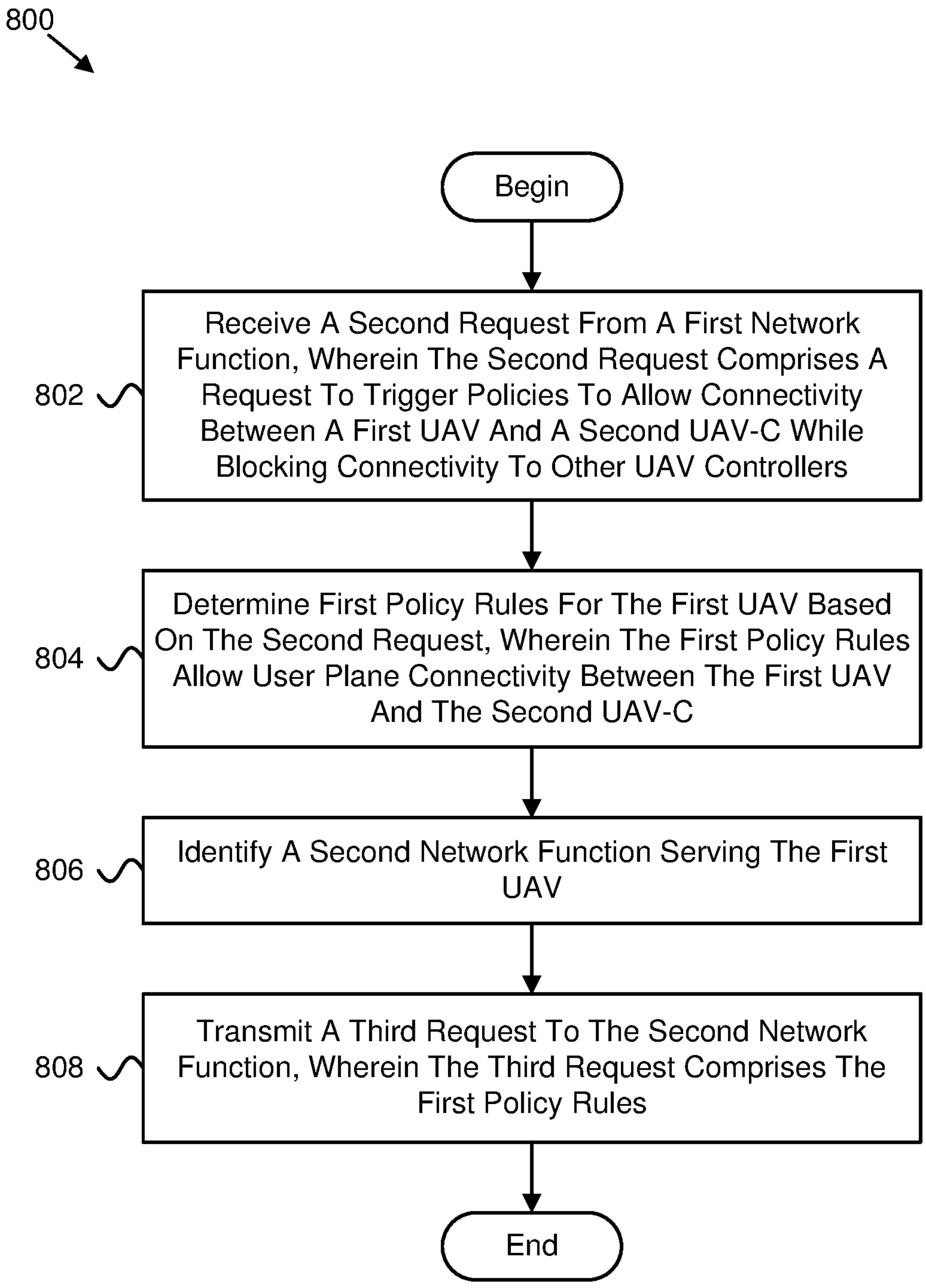
FIG. 8 is a flow chart diagram illustrating another embodiment of a method for allowing connectivity between a UAV and a UAV-C.

FIG. 8 is a flow chart diagram illustrating another embodiment of a method 800 for allowing connectivity between a UAV and a UAV-C. In some embodiments, the method 800 is performed by an apparatus, such as the network unit 104. In certain embodiments, the method 800 may be performed by a processor executing program code, for example, a microcontroller, a microprocessor, a CPU, a GPU, an auxiliary processing unit, a FPGA, or the like.

In various embodiments, the method 800 includes receiving 802 a second request from a first network function. The second request includes a request to trigger policies to allow connectivity between a first UAV and a second UAV-C while blocking connectivity to other UAV controllers. In some embodiments, the method 800 includes determining 804 first policy rules for the first UAV based on the second request. The first policy rules allow user plane connectivity between the first UAV and the second UAV-C. In certain embodiments, the method 800 includes identifying 806 a second network function serving the first UAV. In various embodiments, the method 800 includes transmitting 808 a third request to the second network function, wherein the third request comprises the first policy rules.

In certain embodiments, the method 800 further comprises determining policy and charging rules for the first device, wherein the policy and charging rules comprise information that connectivity from the first device is only allowed to the second UAV-C. In some embodiments, the method 800 further comprises transmitting a third request to a session management function, wherein the third request comprises a request to trigger policies to allow connectivity between the first UAV and the second UAV-C while blocking connectivity to the other UAV controllers. In various embodiments, the method 800 further comprises receiving a third response, wherein the third response comprises an acknowledgement of the third request.

In one embodiment, an apparatus comprises: a receiver to receive a first request from a first USS, wherein the first request indicates to replace a first UAV-C of a first UAV, and the first request comprises an IP address of the first UAV, a requested QoS, flow descriptors identifying traffic, UAV to UAV-C pairing information, or some combination thereof: and a transmitter to transmit a second request to a policy control function, wherein the second request comprises a request to trigger policies to allow connectivity between the first UAV and a second UAV-C based on the UAV to UAV-C pairing information.

In certain embodiments, the UAV to UAV-C pairing information is identified based on an address of the second UAV-C.

In some embodiments, the apparatus further comprises a processor to authorize the first request before transmitting the second request.

In various embodiments, the receiver further to receive a first response from the policy control function, wherein the first response comprises an acknowledgment of the second request.

In one embodiment, the transmitter further to transmit a second response to the first application function, and the second response comprises an acknowledgment of the first request.

In certain embodiments, the USS comprises an application function.

In some embodiments, the UAV to UAV-C pairing information comprises information indicating that connectivity from the first UAV is only allowed to the second UAV-C.

In one embodiment, a method in a network function comprises: receiving a first request from a first USS, wherein the first request indicates to replace a first UAV-C of a first UAV, and the first request comprises an IP address of the first UAV, a requested QoS, flow descriptors identifying traffic, UAV to UAV-C pairing information, or some combination thereof; and transmitting a second request to a policy control function, wherein the second request comprises a request to trigger policies to allow connectivity between the first UAV and a second UAV-C based on the UAV to UAV-C pairing information.

In certain embodiments, the UAV to UAV-C pairing information is identified based on an address of the second UAV-C.

In some embodiments, the method further comprises authorizing the first request before transmitting the second request.

In various embodiments, the method further comprises receiving a first response from the policy control function, wherein the first response comprises an acknowledgment of the second request.

In one embodiment, the method further comprises transmitting a second response to the first application function, wherein the second response comprises an acknowledgment of the first request.

In certain embodiments, the USS comprises an application function.

In some embodiments, the UAV to UAV-C pairing information comprises information indicating that connectivity from the first UAV is only allowed to the second UAV-C.

In one embodiment, an apparatus comprises: a receiver to receive a second request from a network function, wherein the second request comprises a request to trigger policies to allow connectivity between a first UAV and a second UAV-C while blocking connectivity to other UAV controllers: and a transmitter to transmit a first response to the network function, wherein the first response comprises an acknowledgment of the second request.

In certain embodiments, the apparatus further comprises a processor to determine policy and charging rules for the first device, wherein the policy and charging rules comprise information that connectivity from the first device is only allowed to the second UAV-C.

In some embodiments, the transmitter further to transmit a third request to a session management function, and the third request comprises a request to trigger policies to allow connectivity between the first UAV and the second UAV-C while blocking connectivity to the other UAV controllers.

In various embodiments, the receiver further to receive a third response, and the third response comprises an acknowledgement of the third request.

In one embodiment, a method in a policy control function comprises: receiving a second request from a network function, wherein the second request comprises a request to trigger policies to allow connectivity between a first UAV and a second UAV-C while blocking connectivity to other UAV controllers; and transmitting a first response to the network function, wherein the first response comprises an acknowledgment of the second request.

In certain embodiments, the method further comprises determining policy and charging rules for the first device, wherein the policy and charging rules comprise information that connectivity from the first device is only allowed to the second UAV-C.

In some embodiments, the method further comprises transmitting a third request to a session management function, wherein the third request comprises a request to trigger policies to allow connectivity between the first UAV and the second UAV-C while blocking connectivity to the other UAV controllers.

In various embodiments, the method further comprises receiving a third response, wherein the third response comprises an acknowledgement of the third request.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus for performing a network function, the apparatus comprising:
- at least one memory; and
- at least one processor coupled with the at least one memory and configured to cause the apparatus to:
  - receive a first request from a first uncrewed aerial system (UAS) service supplier (USS) function, wherein the first request indicates to replace a first unmanned aerial vehicle controller (UAV-C) of a first unmanned aerial vehicle (UAV), and the first request comprises a requested quality of service (QoS), flow descriptors identifying traffic, and UAV to UAV-C pairing information; and
  - transmit a second request to a policy control function, wherein the second request comprises a request to trigger policies to allow connectivity between the first UAV and a second UAV-C based on the UAV to UAV-C pairing information.

2. The apparatus of claim 1, wherein the UAV to UAV-C pairing information is identified based on an address of the second UAV-C.

3. The apparatus of claim 1, wherein the at least one processor is configured to cause the apparatus to authorize the first request before transmitting the second request.

4. The apparatus of claim 1, wherein the policy control function is determined based on the IP address of the first UAV.

5. The apparatus of claim 1, wherein the at least one processor is further to cause the apparatus to transmit an acknowledgment of the first request.

6. The apparatus of claim 1, wherein the USS function comprises an application function.

7. The apparatus of claim 1, wherein the UAV to UAV-C pairing information comprises information indicating that connectivity from the first UAV is only allowed to the second UAV-C.

8. A method of performing a network function, the method comprising:
- receiving a first request from a first uncrewed aerial system (UAS) service supplier (USS) function, wherein the first request indicates to replace a first unmanned aerial vehicle controller (UAV-C) of a first unmanned aerial vehicle (UAV), and the first request comprises a requested quality of service (QoS), flow descriptors identifying traffic, and UAV to UAV-C pairing information; and
- transmitting a second request to a policy control function, wherein the second request comprises a request to trigger policies to allow connectivity between the first UAV and a second UAV-C based on the UAV to UAV-C pairing information.

9. The method of claim 8, wherein the UAV to UAV-C pairing information is identified based on an address of the second UAV-C.

10. The method of claim 8, further comprising authorizing the first request before transmitting the second request.

11. An apparatus for performing a third network function, the apparatus comprising:
- at least one memory; and
- at least one processor coupled with the at least one memory and configured to cause the apparatus to:
  - receive a second request from a first network function, wherein the second request comprises a request to trigger policies to allow connectivity between a first unmanned aerial vehicle (UAV) and a second UAV controller (UAV-C) while blocking connectivity to other UAV controllers, wherein the second request is in response to a first request sent to the first network function, wherein the first request is from a first unscrewed arial system (UAS) service supplier (USS) function, wherein the first request indicates to replace a first UAV-C of the first UAV, and the first request comprises a requested quality of service (QoS), flow descriptors identifying traffic, and UAV to UAV-C pairing information;
  - determine first policy rules for the first UAV based on the second request, wherein the first policy rules allow user plane connectivity between the first UAV and the second UAV-C;
  - identify a second network function serving the first UAV; and
  - transmit a third request to the second network function, wherein the third request comprises the first policy rules.

12. The apparatus of claim 11, wherein the at least one processor is configured to cause the apparatus to determine policy and charging rules for a first device, and the policy and charging rules comprise information that connectivity from the first device is only allowed to the second UAV-C.

13. The apparatus of claim 12, wherein the second network function comprises a session management function.

14. The apparatus of claim 13, wherein the at least one processor is configured to cause the apparatus to receive a third response, and the third response comprises an acknowledgement of the third request.

15. A method of performing a third network function, the method comprising:
- receiving a second request from a first network function, wherein the second request comprises a request to trigger policies to allow connectivity between a first unmanned aerial vehicle (UAV), and a second UAV controller (UAV-C) while blocking connectivity to other UAV controllers, wherein the second request is in response to a first request sent to the first network function, wherein the first request is from a first unscrewed arial system (UAS) service supplier (USS) function, wherein the first request indicates to replace a first UAV-C of the first UAV, and the first request comprises a requested quality of service (QoS), flow descriptors identifying traffic, and UAV to UAV-C pairing information;

determining first policy rules for the first UAV based on the second request, wherein the first policy rules allow user plane connectivity between the first UAV and the second UAV-C;

identifying a second network function serving the first UAV; and transmitting a third request to the second network function, wherein the third request comprises the first policy rules.

16. The method of claim 15, further comprising determining policy and charging rules for a first device, and the policy and charging rules comprise information that connectivity from the first device is only allowed to the second UAV-C.

17. The method of claim 16, wherein the second network function comprises a session management function.

18. The method of claim 17, further comprising receiving a third response, and the third response comprises an acknowledgement of the third request.

19. The method of claim 8, wherein the policy control function is determined based on the IP address of the first UAV.

20. The method of claim 8, wherein the USS function comprises an application function.

* * * * *